(12) United States Patent
Rocca et al.

(10) Patent No.: US 12,552,363 B2
(45) Date of Patent: Feb. 17, 2026

(54) METHOD AND SYSTEM FOR CONTROLLING A VEHICLE IN PRESENCE OF HYDROPLANING

(71) Applicant: Pirelli Tyre S.p.A., Milan (IT)

(72) Inventors: Marco Rocca, Milan (IT); Federico Roselli, Milan (IT); Stefano Carnier, Milan (IT); Matteo Corno, Milan (IT); Sergio Matteo Savaresi, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 15 days.

(21) Appl. No.: 18/837,773

(22) PCT Filed: Feb. 16, 2023

(86) PCT No.: PCT/IT2023/050049
§ 371 (c)(1),
(2) Date: Aug. 12, 2024

(87) PCT Pub. No.: WO2023/161968
PCT Pub. Date: Aug. 31, 2023

(65) Prior Publication Data
US 2025/0162571 A1   May 22, 2025

(30) Foreign Application Priority Data
Feb. 22, 2022   (IT) .................. 102022000003239

(51) Int. Cl.
*B60W 30/02*   (2012.01)
*B60W 10/06*   (2006.01)
*B60W 10/18*   (2012.01)

(52) U.S. Cl.
CPC ............ *B60W 30/02* (2013.01); *B60W 10/06* (2013.01); *B60W 10/18* (2013.01);
(Continued)

(58) Field of Classification Search
CPC ...... B60W 30/02; B60W 10/06; B60W 10/18; B60W 2210/13; B60T 8/17551; B60T 8/1725
See application file for complete search history.

(56) References Cited

U.S. PATENT DOCUMENTS

| | | | |
|---|---|---|---|
| 5,765,119 A * | 6/1998 | Otabe | B60T 8/172 701/80 |
| 2008/0245456 A1* | 10/2008 | Spetler | B60T 8/1725 73/146 |

(Continued)

FOREIGN PATENT DOCUMENTS

| | | |
|---|---|---|
| DE | 60106400 T2 | 11/2005 |
| EP | 2832617 A1 | 4/2015 |
| WO | 2021046871 A1 | 4/2010 |

OTHER PUBLICATIONS

International Search Report form the European Patent Office in corresponding International Application No. PCT/IT2023/050049 mailed Feb. 16, 2023.
(Continued)

*Primary Examiner* — George C Jin
(74) *Attorney, Agent, or Firm* — Finnegan, Henderson, Farabow, Garrett & Dunner, L.L.P.

(57) ABSTRACT

Control method and system (99) of a vehicle (1) moving on a road surface, wherein the system comprises a detection module (2) for detecting in real time a respective hydroplaning intensity (HI) for each tyre (3) of the vehicle (1), an actuation device (9) connected to each wheel (7) of the vehicle (1) and a command and control unit (8) programmed and configured for performing the control method comprising: —comparing each respective hydroplaning intensity (HI) with a first threshold; —upon the occurrence of a starting condition such that the respective hydroplaning intensity (HI) of at least one tyre (3) reaches the first
(Continued)

threshold, then: —calculating in real time a reference value (YRr) of a parameter representative of a lateral motion of the vehicle (1) as a function of a longitudinal speed (Vxc) and of a steering angle (STA) of the vehicle; —calculating in real time a corrective moment (Mz) as a function of the reference value (YRr) and of a current value (YRc) of the parameter detected in real time; —applying in real time to each wheel (7) a respective torque (Tr) calculated in real time as a function of the corrective moment (Mz) and of the hydroplaning intensity (HI) of the respective tyre (3).

17 Claims, 8 Drawing Sheets

(52) U.S. Cl.
CPC ..... *B60W 2510/20* (2013.01); *B60W 2520/10* (2013.01); *B60W 2530/20* (2013.01)

(56) References Cited

U.S. PATENT DOCUMENTS

| | | | |
|---|---|---|---|
| 2014/0195118 A1* | 7/2014 | Okubo | B60W 10/18 701/41 |
| 2018/0178769 A1 | 6/2018 | Raste | |
| 2020/0339129 A1* | 10/2020 | Weissenmayer | B60W 40/06 |
| 2021/0086786 A1 | 3/2021 | Kretschmann | |
| 2022/0009502 A1 | 1/2022 | Yokoyama | |

OTHER PUBLICATIONS

Written Opinion of the International Searching Authority from the European Patent Office in corresponding International Application No. PCT/IT2023/050049 mailed Feb. 16, 2023.

* cited by examiner

METHOD AND SYSTEM FOR CONTROLLING A VEHICLE IN PRESENCE OF HYDROPLANING

This application is a national stage entry application under 35 U.S.C. § 371 of International Application No. PCT/IT2023/050049, filed on Feb. 16, 2023, and claims priority to Italian Application No. 102022000003239, filed Feb. 22, 2022; the contents of each application is incorporated herein by reference in its entirety.

TECHNICAL FIELD OF THE INVENTION

The present invention concerns a control method and system of a vehicle moving on a road surface in the presence of hydroplaning. The present invention also concerns a vehicle comprising a control system.

STATE OF THE ART

A tyre typically has a substantially toroidal structure around an axis of rotation thereof during operation, and presents an equatorial plane orthogonal to the axis of rotation, said equatorial plane being typically a plane of (substantial) geometric symmetry (e.g. neglecting any minor asymmetries, such as the tread pattern and/or the writings on the sides and/or the internal structure).

By "crown portion" it is meant the portion of the tyre located at the tread band.

The terms "radial" and "axial" are used with reference to a perpendicular direction and to a direction parallel to the axis of rotation of the tyre, respectively.

The term "tangential" is used with reference to a direction generally turned according to the rolling direction of the tyre, perpendicular to both the radial direction and the axial direction.

By "footprint" it is meant the portion of the outer surface of the tread band which, during the rolling of the mounted tyre subjected to a load (for example as a result of the mounting under a vehicle), is in contact with the rolling surface at all times. The footprint typically has substantially null curvature (or substantially infinite radius of curvature), or in any case it substantially assumes the conformation of the rolling surface.

By "footprint portion" it is meant the portion of the crown portion corresponding to the footprint.

The term "longitudinal" is used to indicate a direction (preferably with sense concordant with a forward direction of travel of the vehicle) that is tangent instant by instant to a trajectory of the vehicle.

The term "transverse" (or equivalently "lateral") is used to indicate a direction substantially orthogonal to the longitudinal direction and substantially parallel to the road surface.

In the present context, hydroplaning is understood to mean the condition in which a tyre, rolling on a road surface, decreases the grip with said road surface, even losing it totally, due to the presence of a layer of water interposed between the tyre and the road.

The hydroplaning condition typically occurs when the drainage and the expulsion of water in the channels and/or in grooves of the tread, at the footprint area, becomes insufficient so much so that a build-up of water is caused between the tyre and the road surface capable of lifting (in a more or less extensive way) the tyre from the road surface just at the footprint area.

This lifting causes in particular a reduction of the footprint area, which in turn generates the aforementioned decrease in the grip of the tyre with the road surface, with consequent loss of directionality and traction on the part of the tyre itself.

In the following, a "hydroplaning intensity" or "hydroplaning condition intensity" will be referred to generally indicate an estimate of the residual grip of a tyre to the road surface. This estimate may range from a level corresponding to a substantially maximum grip condition in case of the tyre rolling on a substantially dry surface or with a thin layer of water that does not substantially modify the footprint of the tyre itself on the ground, to one or more levels respectively corresponding to one or more conditions of partial hydroplaning, i.e. of a partial loss of grip of the tyre due to the presence of a layer of water (but with a residual portion of the footprint area still present between the tyre and road surface), as well as to one or more levels corresponding to a total hydroplaning condition, i.e. to a total or substantially total loss of grip of the tyre with the road surface (i.e. to a total or substantially total cancellation of the footprint area of the tyre on the ground).

The hydroplaning phenomenon can be extremely dangerous, since in such conditions the driver can substantially lose control of the vehicle, and no longer be able to follow the road, avoid obstacles, etc. Document US 2018/0178769 A1 describes a method and device for driving assistance in case of hydroplaning.

Document EP 2 832 617 A1 describes a control apparatus for a vehicle, which regulates the rotation phase of each wheel based on a correlation between rotation phase of the wheel and hydroplaning characteristics, when a vehicle is in hydroplaning conditions.

SUMMARY OF THE INVENTION

In the context of the methods for controlling a vehicle, the Applicant has found that at present there are no systems on the market capable of activating the control of a vehicle in case of hydroplaning. The Applicant has also found that the methods and devices proposed in the aforementioned documents present several problems.

For example, the method of US 2018/0178769 A1, for triggering the driver assistance routine, detects the possible hydroplaning condition of the vehicle based on signals coming from the front wheel rotation speed sensors (e.g. ABS encoder): if these sensors indicate intense sliding (positive or negative depending on the type of traction of the vehicle), i.e. if the sliding of at least one of the front wheels lies outside a given range, then the hydroplaning condition is recognized. In such a circumstance, the start of the driving assistance routine is activated by action (braking) on the rear wheels, which are assumed not to be in the hydroplaning condition.

The Applicant has found that the aforementioned method of US 2018/0178769 A1, by intervening when the front tyres are already completely lifted and sliding with respect to the road surface (and have therefore substantially lost grip), operates only in the condition of total hydroplaning of at least one of the front wheels.

However, the Applicant has observed that, under real driving conditions, the tyres may also incur in partial hydroplaning conditions, i.e. conditions in which the tyre, due to the layer of water, experiences a partial lift, with reduction of the footprint area and decrease in the grip, while nevertheless maintaining at least partially grip with the road surface (i.e. with sufficiently low sliding values).

In a persistent partial hydroplaning condition therefore, the method of US 2018/0178769 A1 would never intervene.

Similarly, activating the assistance routine only upon the occurrence of the total hydroplaning condition could mean, in certain conditions, activating the routine only at the end of a transient period in which the tyres were in the partial hydroplaning condition.

Both of the aforementioned situations could therefore lead to situations of potential danger for the driver and the passengers, since the driver's control of the vehicle could already be compromised and/or limited, especially in the event of sudden manoeuvres (e.g. sudden changes in direction), well before the activation of the assistance routine of US 2018/0178769 A1, and for which this routine could not compensate.

The Applicant also observes that determining the hydroplaning condition on the basis of the sliding of the front wheels risks being indistinguishable from other situations in which the vehicle is travelling on a slippery surface (for example icy), with abnormal sliding of the tyres of all the wheels, or in any case also of at least one of the rear wheels. Activating, under these conditions, a driving assistance routine such as the one described in US 2018/0178769 A1 could pose a risk, due to the possible blocking of the rear wheels and of the consequent loss of control over the vehicle.

Furthermore, the Applicant notes that the assistance routine of US 2018/0178769 A1 risks overestimating the maximum grip that the rear wheels can develop.

As regards EP 2 832 617 A1, the Applicant considers that the routine described therein, in addition to being extremely complex to perform in practice, also risks overestimating the real grip of the tyres.

The Applicant has therefore addressed the problem of realizing a control of a vehicle moving in hydroplaning conditions that is concretely feasible, robust in the face of multiple situations of hydroplaning occurrence and capable of achieving high driving safety.

According to the Applicant, the aforementioned problem is solved by a control method and system of a vehicle that is activated in the event that the motion of the vehicle does not correspond to safety conditions (e.g. the vehicle's attitude does not correspond to the intentions of the driver and/or the vehicle's speed/acceleration is too high), wherein an intensity of a hydroplaning condition is determined in real time for each tyre, and if a hydroplaning intensity of at least one tyre is greater than or equal to a given threshold, a torque (e.g. braking and/or driving torque) is applied to the wheels of the vehicle, wherein said torque is calculated as a function of a corrective moment of the attitude, and/or of a corrective longitudinal force, and of the respective hydroplaning intensity.

According to one aspect the invention relates to a method for controlling a vehicle moving on a road surface.

The method comprises:
for each tyre of said vehicle rolling on said road surface, determining in real time a respective hydroplaning intensity;
comparing in real time each respective hydroplaning intensity with a first threshold;
upon the occurrence of a starting condition such that said respective hydroplaning intensity of at least one tyre reaches said first threshold, performing one or more of the following operations:
Preferably, it is provided acquiring in real time a current value of a longitudinal speed of said vehicle.

Preferably, it is provided acquiring in real time a steering angle of said vehicle.

Preferably, it is provided calculating in real time a reference value of a parameter representative of a lateral motion of said vehicle as a function of said current value of the longitudinal speed and of said steering angle.

Preferably, it is provided detecting in real time a current value of said parameter;

Preferably, it is provided calculating in real time a corrective moment as a function of said reference value and of said current value of said parameter;

Preferably, it is provided applying in real time to each wheel of said vehicle a respective torque calculated in real time as a function of said corrective moment and of said hydroplaning intensity of the respective tyre.

Preferably, it is provided calculating in real time a reference value of a parameter representative of a longitudinal motion of said vehicle.

Preferably it is provided acquiring in real time a current value of said parameter representative of the longitudinal motion.

Preferably, it is provided calculating in real time a corrective longitudinal force as a function of said reference value and of said current value of the parameter representative of the longitudinal motion.

Preferably, it is provided applying in real time to each wheel of said vehicle a respective torque calculated in real time as a function of said corrective longitudinal force and of said hydroplaning intensity of the respective tyre.

According to another aspect the invention relates to a control system of a vehicle moving on a road surface.

The system comprises:
a detection module for detecting in real time a respective hydroplaning intensity for each tyre of said vehicle rolling on said road surface;
an actuation device operatively connected to each wheel of said vehicle;
a command and control unit operatively connected to said detection module and to said actuation device.

Preferably said command and control unit is programmed and configured for:
comparing each respective hydroplaning intensity with a first threshold;
upon the occurrence of a starting condition such that said respective hydroplaning intensity of at least one tyre reaches said first threshold, performing one or more of the following operations:
receiving as input in real time a first signal representative of a current value of a longitudinal speed of the vehicle;
receiving as input in real time a second signal representative of a steering angle of the vehicle;
calculating in real time a reference value of a parameter representative of a lateral motion of said vehicle as a function of said first and second signal;
receiving as input in real time a third signal representative of a current value of said parameter;
calculating in real time a corrective moment as a function of said reference value and of said current value of said parameter;
commanding said actuation device for applying in real time to said each wheel a respective torque calculated in real time as a function of said corrective moment and of said hydroplaning intensity of the respective tyre.

Preferably said command and control unit is programmed and configured for:
comparing each respective hydroplaning intensity with a first threshold;

upon the occurrence of a starting condition such that said respective hydroplaning intensity of at least one tyre reaches said first threshold, performing one or more of the following operations:

setting a reference value of a parameter representative of a longitudinal motion of said vehicle;

receiving as input in real time a (fourth) signal representative of a current value of said parameter representative of the longitudinal motion;

calculating in real time a corrective longitudinal force as a function of said reference value and of said current value of said parameter representative of the longitudinal motion;

commanding said actuation device for applying in real time to said each wheel a respective torque calculated in real time as a function of said corrective longitudinal force and of said hydroplaning intensity of the respective tyre.

According to a further aspect, the invention concerns a vehicle comprising the control system according to the present invention.

By the expression "steering angle" it is meant a value representative of an angle formed between a direction assumed by the steering wheels of the vehicle (typically the front wheels) and a longitudinal development direction of the vehicle, such as for example a rotation angle (clockwise and/or counterclockwise) of a steering wheel of the vehicle with respect to a neutral position of the steering wheel (i.e. a position whereby the vehicle travels straight ahead), or a parameter set by the electronics of the vehicle in a self-driving system, or the angle itself formed between the direction assumed by the steering wheels of the vehicle (typically the front wheels) and the longitudinal development direction of the vehicle. According to the Applicant, the determination, for each tyre, of a hydroplaning intensity allows the rolling condition of all tyres to be monitored continuously and in real time.

In this way it is possible to detect promptly, not only the possible occurrence of the hydroplaning condition, but also the respective intensity, for each tyre, thus being able to recognize multiple real driving situations. The fact that the method then performs the correction routine on condition that a hydroplaning intensity of at least one tyre reaches the first threshold, gives the correction a greater activation sensitivity, being therefore able to operate also for partial hydroplaning conditions, and which furthermore have occurred also for a single tyre out of the four typically rolling.

Finally, the application of the torque to each wheel as a function not only of the calculated corrective moment, and/or of the calculated corrective longitudinal force, but also as a function of the hydroplaning intensity of the tyre itself, allows to regulate the action of control, regardless of the purpose of the latter, taking into account the real conditions of grip of the tyre, and thus to limit the risk of blocking the wheel.

In particular, the application of each respective torque, i.e. the implementation of the specific action of control, can be aimed at:

imparting a change in trajectory to the vehicle in accordance with the driver's intentions, when each respective torque is calculated as a function of the corrective moment (in turn calculated as a function of the steering angle); or imparting the vehicle a slowdown, when each respective torque is calculated as a function of the corrective longitudinal force (in turn calculated as a function of the reference value and of the current value of the parameter representative of the longitudinal motion); or both of the aforesaid options, as each respective torque can be calculated both as a function of the corrective moment and of the corrective longitudinal force.

The present invention may have one or more of the following preferred features.

Preferably said command and control unit is programmed and configured for performing one or more of the following operations preferably provided for the method.

Preferably said method comprises, for each tyre, detecting in real time (at least) a respective quantity representative of a motion of said tyre, more preferably of a motion of a crown portion of said tyre.

Preferably said (at least one) respective quantity comprises (at least) one of the following quantities referred to (a crown portion of) a single tyre: displacement, speed, acceleration (e.g. radial and/or axial and/or tangential acceleration) and deformation.

Preferably determining in real time said respective hydroplaning intensity is performed as a function of said respective quantity (for example by processing a respective signal of variation of the respective quantity as a function of the time and/or of the rotation angle of the tyre). In this way, the hydroplaning intensity is determined robustly on the basis of information related to the interaction of the single tyre with the rolling surface.

Preferably said respective quantity is detected at an inner surface of said tyre at the crown portion. In this way the quantity is directly representative of the motion of the crown portion of the tyre, i.e. of the portion that is in contact with the rolling surface.

Preferably said detection module comprises a respective monitoring device associated with each tyre, each monitoring device being fixed at said crown portion of the respective tyre, more preferably fixed on an inner surface at said crown portion. Preferably said monitoring device is adapted to detect said at least one respective quantity referred to the respective tyre.

Preferably said actuation device comprises a braking system and/or motor (e.g. an electric motor). In this way it is possible to apply a braking and/or driving torque to the wheel.

Preferably said parameter representative of the lateral motion comprises, or consists of, (at least) one of the following quantities: yaw rate, lateral acceleration, slip angle (also known as drift angle). Such quantities have been identified by the Applicant as particularly effective in representing the lateral motion of the vehicle for the purposes of the present invention.

In particular, the Applicant believes that the yaw rate is a very effective and simple quantity to handle in real time processing.

Preferably calculating in real time said corrective moment comprises performing in real time a difference between said reference value and said current value of said parameter representative of the lateral motion of said vehicle, and calculating said corrective moment as a function of said difference. In this way, the corrective moment represents the moment to be applied to the vehicle (e.g. by braking and/or accelerating at least one wheel) to ensure that the current value of the parameter representative of the lateral motion of the vehicle equals the (target) reference value, calculated as a function of the current value of longitudinal speed and of the steering angle.

Preferably (a maximum value of) said respective torque decreases as the hydroplaning intensity of the respective tyre increases (and vice versa). In this way the corrective action can be distributed in real time to the wheels in accordance with the current grip of the respective tyres.

Preferably said respective torque is null on condition that said respective hydroplaning intensity of the respective tyre is greater than or equal to a second threshold (preferably greater than said first threshold). In other words said maximum value of the respective torque is null upon reaching/exceeding said second threshold by said hydroplaning intensity. In this way, the risk of generating the blocking at the respective wheel is eliminated, improving safety.

Preferably said parameter representative of the longitudinal motion comprises, or consists of, (at least) one of the following quantities: longitudinal acceleration, longitudinal speed. Such quantities have been identified by the Applicant as being particularly effective in representing the longitudinal motion of the vehicle for the purposes of the present invention. For example, it may be advantageous to use the longitudinal acceleration in order to slow down the vehicle safely, avoiding sudden actions that could result in the loss of control of the vehicle.

Preferably said corrective longitudinal force is calculated as a function of a difference between said current value and said reference value of said parameter representative of the longitudinal motion.

Preferably said respective torque is calculated both as a function of said longitudinal corrective force and as a function of said corrective moment. In this way, both of the above corrective actions are combined, increasing safety.

Preferably said method comprises (typically when said parameter representative of the longitudinal motion does not comprise—nor consists in said longitudinal speed) setting a reference value of the longitudinal speed of said vehicle. The reference value of the longitudinal speed represents the desired safety speed at which it is wished to drive the vehicle.

Preferably said method comprises (typically when said parameter representative of the longitudinal motion does not comprise—nor consists in said longitudinal speed), upon the occurrence of said starting condition, acquiring in real time a current value of the longitudinal speed of the vehicle. Preferably said method comprises comparing in real time said current value of the longitudinal speed with said reference value of the longitudinal speed. Preferably said method comprises cancelling said corrective longitudinal force on condition that said current value of the longitudinal speed reaches said reference value of the longitudinal speed. In this way the vehicle is slowed down only as much as necessary.

Preferably each respective torque to be applied to a wheel is also calculated as a function of the respective hydroplaning intensity of the tyres associated with the other wheels of said vehicle, more preferably by distributing said respective torques so as to minimise one or more (more preferably all) of said respective torques (in relation to a respective maximum value). Preferably it is provided maximising a parameter globally representative of the differences between each respective torque (in modulus) and a respective maximum value (in modulus), said maximum value being calculated in real time as a function of said respective hydroplaning intensity of the respective tyre. In other words, among the possible sets of torques capable of correcting the lateral and/or longitudinal motion of the vehicle as a function of the corrective moment and/or of the corrective longitudinal force calculated, it is preferable to choose those comprising torque values that are as far as possible from the respective maximum applicable value. In this way the torque applied to each wheel is maintained far from the respective maximum value, further reducing the risk of blocking the wheel and increasing safety. In fact, as described above, the maximum torque value applicable to each wheel varies as a function of the hydroplaning intensity detected which, upon sudden variation of the conditions of the asphalt, could be drastically reduced, leading to instantaneous dangerous situations in which the current value of the torque could be very close to, even greater than, the respective maximum value, with the high risk of total blocking of the wheel (and therefore loss of control).

Preferably said method, upon the occurrence of said starting condition, comprises interrupting a transfer of driving force from a motor of the vehicle to the driving wheels of the vehicle, so as to reduce the speed of the vehicle and further increase safety.

DETAILED DESCRIPTION OF SOME EMBODIMENTS OF THE INVENTION

The features and advantages of the present invention will be further clarified from the following detailed description of some embodiments, presented by way of non-limiting example of the present invention, with reference to the attached figures.

Figure 1:
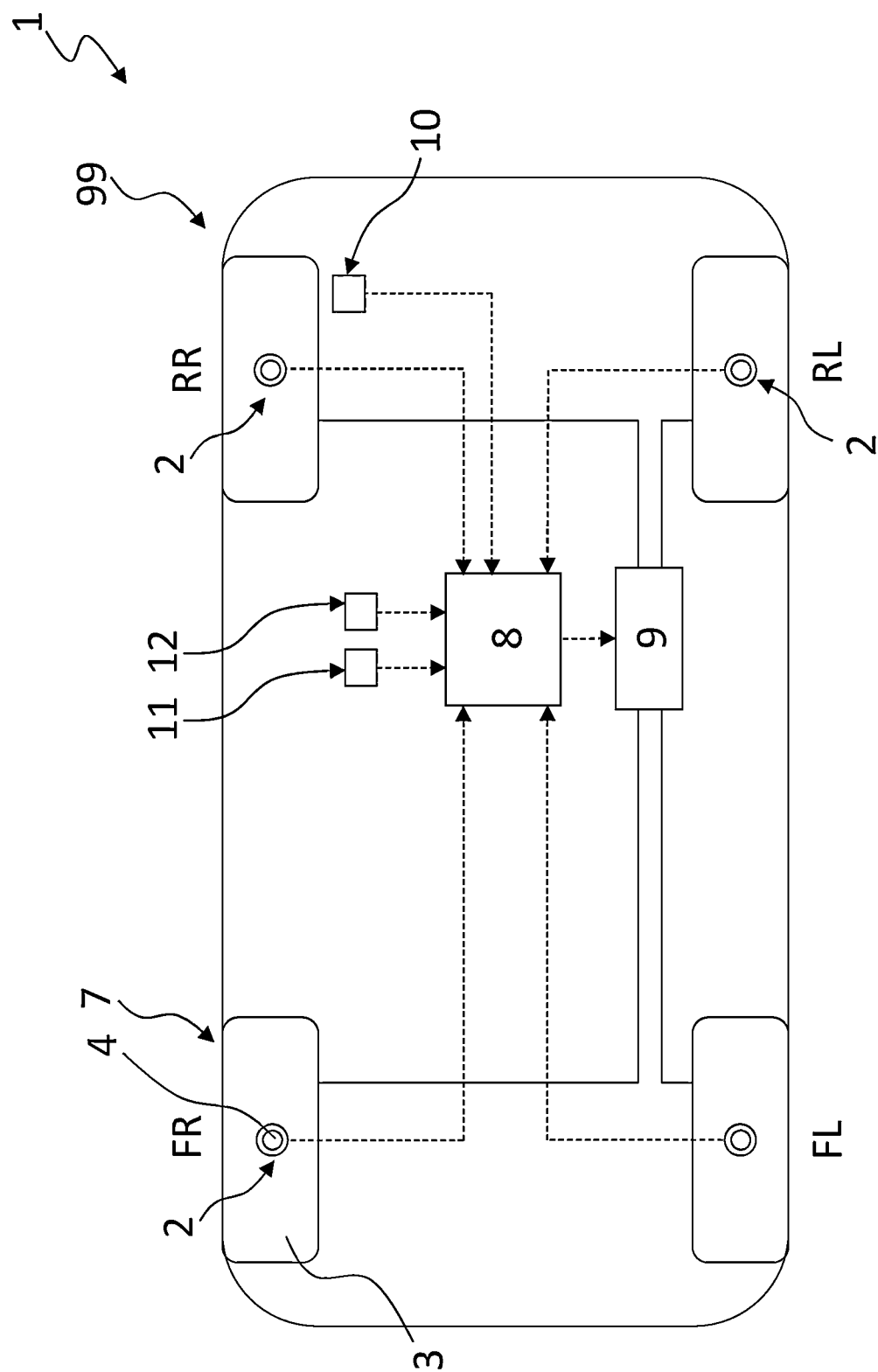
FIG. 1 schematically shows a vehicle according to the present invention.

FIG. 1 schematically shows a vehicle 1 according to the present invention. The vehicle 1 may be a vehicle with an endothermic and/or electric motor, with two or more driving wheels.

Exemplarily the vehicle 1 comprises four wheels 7, each provided with a respective tyre 3 (partially also shown in FIG. 2) rolling on a road surface (not shown). The wheels 7 are exemplarily identified as front right FR, front left FL, rear right RR and rear left RL.

The vehicle 1 comprises a control system 99 of the vehicle moving on the road surface.

The system 99 comprises a detection module 2 for detecting in real time a respective hydroplaning intensity for each tyre 3 of the vehicle 1 rolling on the road surface.

Figure 2:
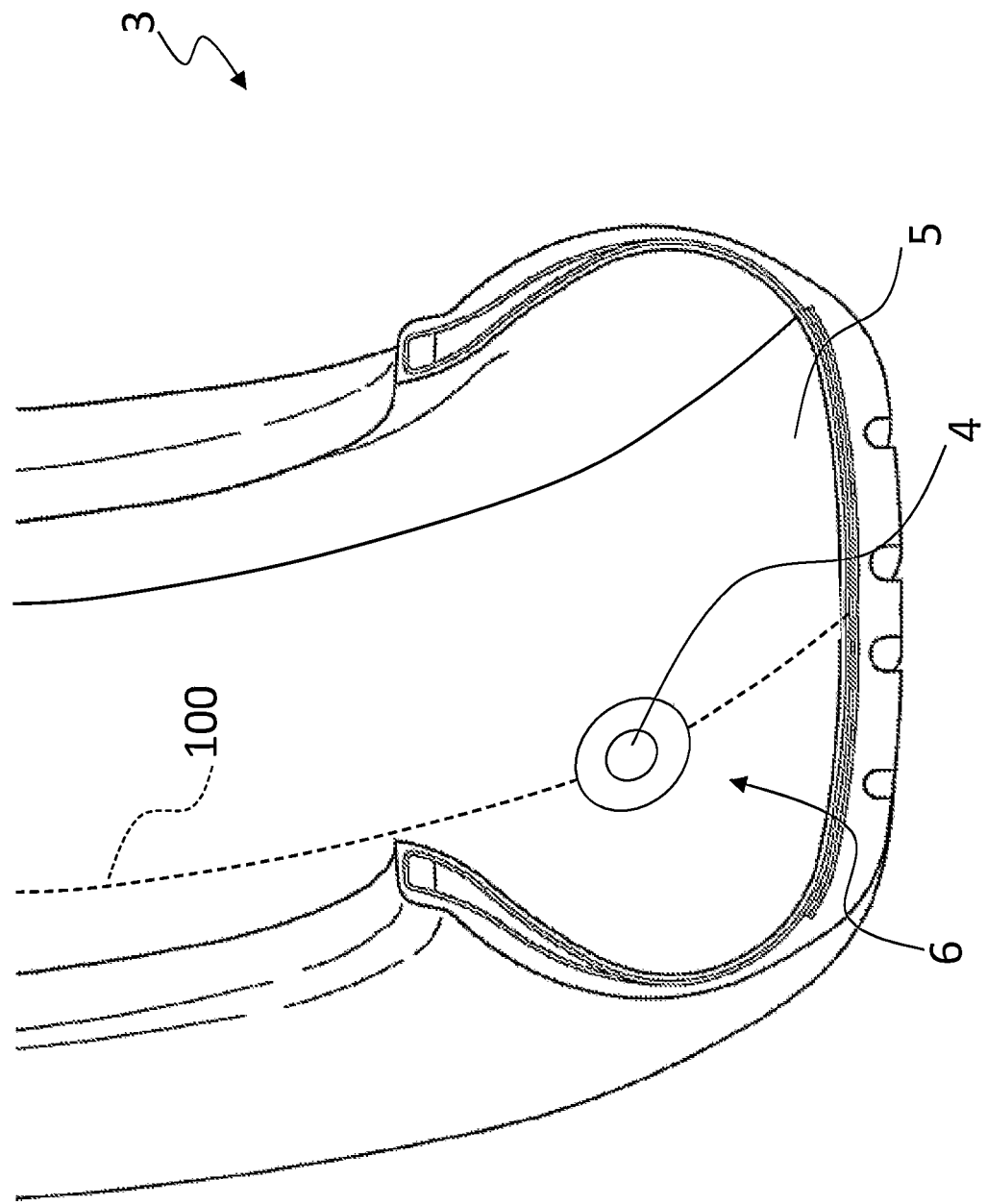
FIG. 2 schematically shows a detail of the vehicle of FIG. 1.

Exemplarily the detection module 2 comprises a monitoring device 4 for each tyre 3 (FIGS. 1 and 2). For example, the monitoring device 4 may be of the type described in one of the following documents on behalf of the same Applicant: WO 2018/065846 A1, WO 2019/123118 A1, WO 2020/026281 A1, WO 2020/026282 A1. Preferably, the monitoring device 4 may comprise at least one accelerometer capable of detecting an acceleration in radial, and/or axial, and/or tangential direction of the tyre.

Exemplarily each monitoring device 4 is fixed on an inner surface 5 of the tyre, at a crown portion 6 of the respective tyre 3 (FIG. 2). In particular, the monitoring device 4 can be fixed to a liner of the tyre 3, typically by gluing (for example by means of a structural adhesive or by means of a pressuresensitive adhesive). Preferably the monitoring device 4 can be substantially fixed at an equatorial plane 100 of the tyre 3. Further monitoring devices (not shown) may be arranged at a more lateral position on the inner surface of the tyre 3, and/or at different angular positions along the inner circumference of the tyre 3.

The system 99 also comprises an actuation device 9 (shown only schematically in FIG. 1) operatively connected to each wheel 7 of the vehicle 1.

Exemplarily the actuation device 9 comprises a braking system of the vehicle 1.

In one embodiment, not shown, the actuation device 9 may comprise (in addition to or as an alternative to the braking system) a motor system (e.g. an electric motor for each wheel, typically in the case of an electric vehicle, or a motor force distribution system of an endothermic motor, in the case of a vehicle with four driving wheels).

The control system 99 further comprises a command and control unit 8 (shown only schematically in FIG. 1) operatively connected to the detection module 2 and to the actuation device 9.

Exemplarily the command and control unit 8 is operatively connected to the four monitoring devices 4 of the detection module 2 by means of a radio signal.

In use, the control system 99 allows to perform a method for controlling a vehicle moving on a road surface according to the present invention, typically by means of one or more hardware devices programmed by means of one or more software modules residing and/or loaded on appropriate memories.

An embodiment of the control method according to the present invention will now be described with reference to FIGS. 3-6.

Figure 3:
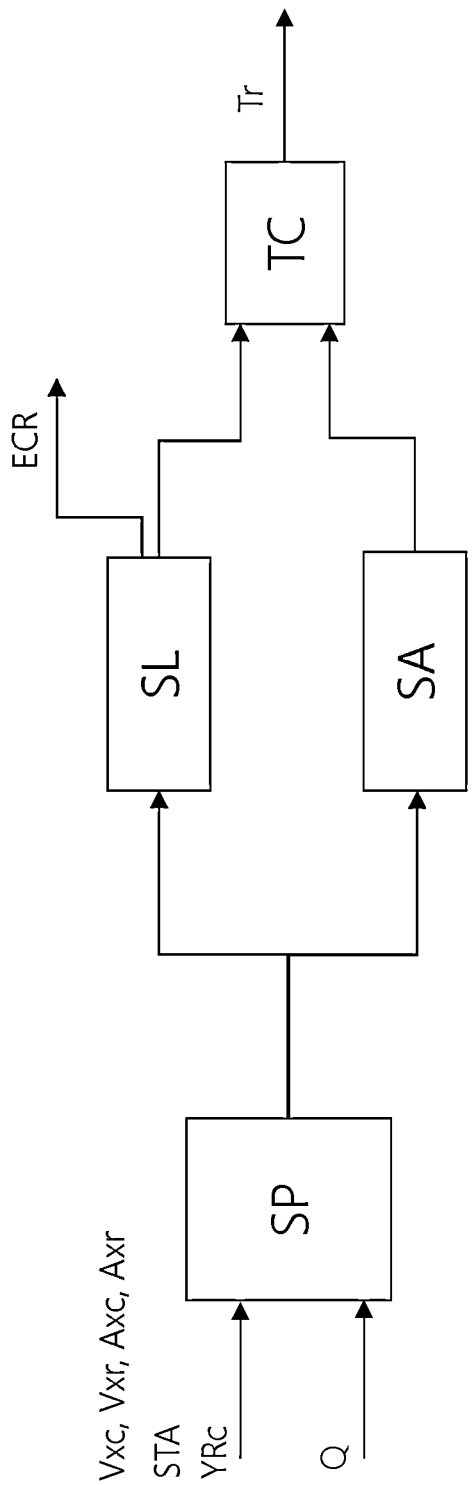
FIG. 3 shows a logical block diagram of the steps of an embodiment of a control method according to the present invention.

Exemplarily, the command and control unit 8 is programmed and configured for performing the following operations provided for the control method and symbolically shown in FIG. 3 in four sequential routines (wherein SL and SA carried out in parallel, as described below). The routines are exemplarily:

- a signal processing routine SP (signal processing);
- a speed limitation routine of the vehicle SL (speed limit);
- a routine for adjusting the stability of the vehicle SA (stability adjustment);
- a calculation routine TC (torque computing) of the respective torque to be applied to the wheels of the vehicle.

Routine SP

Firstly, the method comprises, for each tyre 3 of the vehicle 1 rolling on the road surface, determining in real time a respective hydroplaning intensity HI.

Exemplarily the method comprises, for each tyre 3, detecting in real time a respective quantity Q representative of a motion of the crown portion 6 of the tyre 3.

Exemplarily, the respective quantity Q is detected at the inner surface 5 of the tyre 3 at the crown portion 6 by the respective monitoring device 4.

Exemplarily determining in real time the respective hydroplaning intensity HI is performed as a function of the respective detected quantity Q.

Exemplarily the respective quantity Q is a radial acceleration undergone by the crown portion 6 during the rolling of the tyre 3 on the road surface. More in detail, the control method exemplarily comprises determining the hydroplaning intensity HI of each tyre 3 starting from the detection of an acceleration signal, for example representative of the aforesaid radial acceleration. More in particular, the hydroplaning intensity can be determined by analysis of the derivative of the radial acceleration signal, and in particular of its relative maxima, like for example described in WO 2019/123501 A1 in the name of the same Applicant.

In another example, the hydroplaning intensity can be determined by frequency analysis of accelerometric signal portions (or more generally of a signal related to the deformation undergone by the tyre) corresponding to the footprint and/or to zones contiguous to the footprint area, as described in WO 2010/046871 A1, also in the name of the same Applicant.

Preferably the hydroplaning intensity HI of each tyre (which can be determined as a continuous value) can be discretized into discrete levels, referred to as "hydroplaning levels". For example, it is possible to envisage hydroplaning levels in numbers greater than or equal to three and less than or equal to ten, for example equal to eight (i.e. 0-7). In the latter case, the hydroplaning intensity HI of each tyre 3 determined as described above can assume a value comprised between null (absence of hydroplaning) and seven (total hydroplaning). The intermediate levels represent different partial hydroplaning conditions, with a progressively increasing level corresponding to a decrease in the level of grip between tyre and road surface.

Subsequently, the method exemplary comprises, on the part of the command and control unit 8, comparing each respective hydroplaning intensity HI with a first threshold. Given the discretization assumed by the hydroplaning intensity, the first threshold exemplarily coincides with a chosen hydroplaning level, for example level two.

Upon the occurrence of a starting condition such that the respective hydroplaning intensity of at least one tyre 3 reaches the first threshold (i.e. HI>=2), it is exemplarily provided proceeding with the routines SL, SA and TC (described in detail below).

Routine SL

Figure 4:
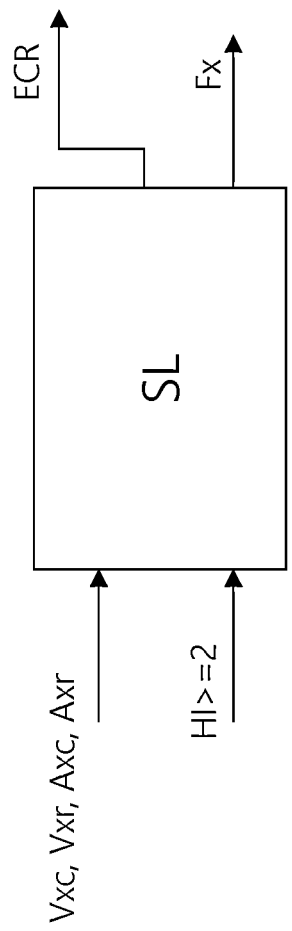
FIGS. 4, 5 and 6 show in detail a respective logical block of the diagram of FIG. 3.

FIG. 4 schematically shows the speed limitation routine SL.

In order to perform the routine SL, the method comprises, for example, acquiring in real time a current value of a longitudinal speed Vxc of the vehicle 1. To this end, the command and control unit 8 is exemplarily programmed and configured for receiving in real time a first signal representative of the current value of the longitudinal speed Vxc of the vehicle 1.

Exemplarily the current value of the longitudinal speed Vxc of the vehicle 1 can be acquired by means of at least one detection sensor 10 (shown only schematically in FIG. 1) for detecting the rotation speed of at least one wheel 7 (e.g. ABS encoder), and/or by means of at least one of the monitoring devices 4, and/or further methods (e.g. GPS detection). Exemplarily the detection sensor 10 is shown in FIG. 1 in combination with the rear right wheel RR of the vehicle. Equivalently the detection sensor 10 may be combined with any other wheel, or each wheel may comprise a respective rotation speed detection sensor.

Exemplarily the method comprises setting a reference value Axr (negative) of a longitudinal acceleration of the vehicle. This reference value Axr can be set as a function of the current value of the longitudinal speed Vxc detected and/or of the maximum hydroplaning intensity detected.

Exemplarily, it is also provided acquiring in real time a current value Axc of the longitudinal acceleration. To this end, the control system 99 comprises, exemplarily, an acceleration sensor 11 (FIG. 1), connected to the command and control unit 8 and preferably installed on board the vehicle 1. For example the acceleration sensor 11 may be of the 3DOF IMU type.

Preferably it is provided calculating in real time a corrective longitudinal force Fx as a function of the reference value Axr and of the current value Axc of the longitudinal acceleration. In particular, the corrective longitudinal force Fx is calculated as a function of a difference between the current value Axc and the reference value Axr of the longitudinal acceleration.

Exemplarily the method further comprises setting a reference value Vxr of the longitudinal speed of the vehicle, comparing in real time the current value Vxc of the longitudinal speed with the reference value Vxr and cancelling the corrective longitudinal force Fx on condition that the current value Vxc of the longitudinal speed reaches the reference value Vxr.

In combination or as an alternative to using the current and reference values of the longitudinal acceleration Axc and Axr, it may be provided setting the reference value Vxr of the longitudinal speed (e.g. as a function of the respective current value Vxc) and calculating in real time the corrective longitudinal force Fx as a function of the current value Vxc and of the reference value Vxr of the longitudinal speed.

Exemplarily the method further comprises interrupting a transfer of driving force from a motor (not shown) of the vehicle to the driving wheels of the vehicle. To this end, the routine SL also outputs an ECR (engine cut-off request) command to a control unit (not shown) of the vehicle.

Exemplarily the method also comprises ignoring an acceleration request coming from an accelerator (e.g. pedal and/or software for cruise control and/or self-driving—not shown) of the vehicle.

Routine SA

Figure 5:
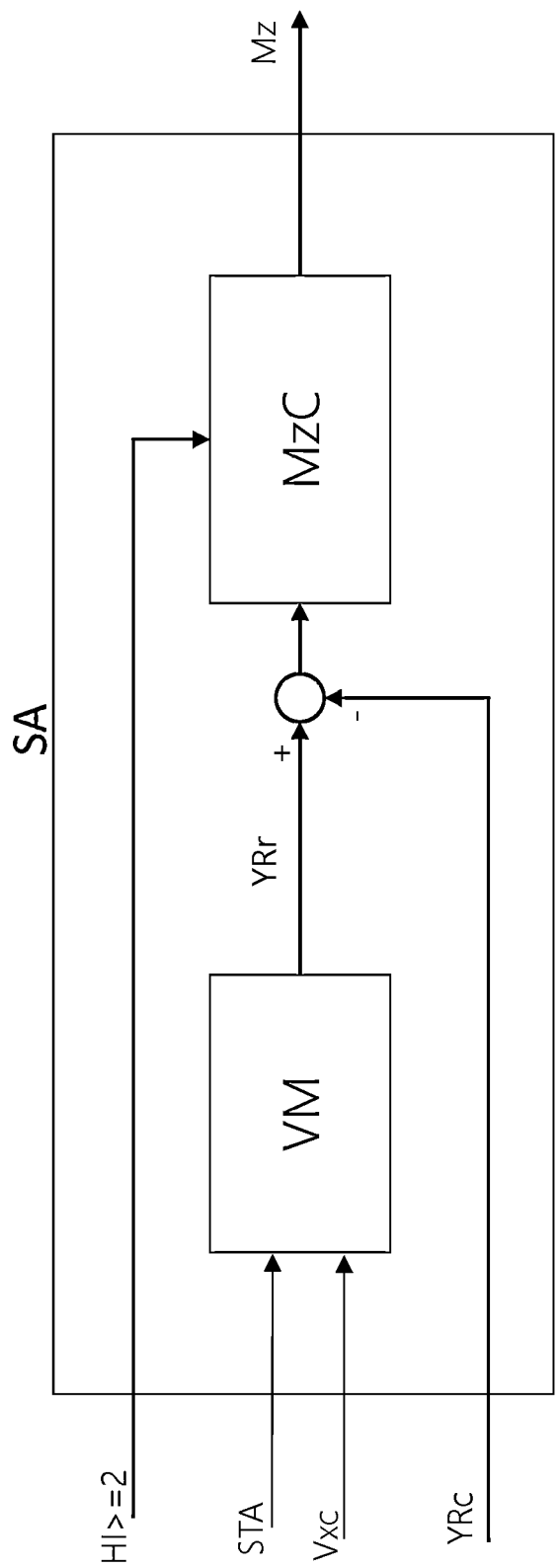

FIG. 5 schematically shows the stability adjustment routine of the vehicle SA, which is exemplarily performed in parallel to the routines SL.

In order to perform the routine SA, the method exemplary comprises acquiring in real time the current value of the longitudinal speed Vxc of the vehicle 1 (e.g. as described above).

Exemplarily the method further comprises acquiring in real time also a steering angle STA of the vehicle 1. To this end the command and control unit 8 is exemplarily programmed and configured for receiving as input in real time a second signal representative of the steering angle STA of the vehicle 1.

Exemplarily the method thus comprises calculating in real time a reference value YRr of a parameter representative of a lateral motion of the vehicle 1 as a function of the current value of the longitudinal speed Vxc and of the steering angle STA. To this end, the command and control unit is exemplarily programmed and configured for calculating in real time the reference value YRr of the parameter representative of the lateral motion of the vehicle as a function of the first and second signals.

Exemplarily the method comprises calculating the reference value YRr as a function of a mathematical model VM (vehicle model) of the vehicle 1, the model VM having been previously loaded into the command and control unit 8.

The reference value YRr in practice corresponds to the expected (or ideal) behaviour for the vehicle as a function of the current value of the longitudinal speed Vxc and of the steering angle STA.

Exemplarily the method further comprises detecting in real time a current value YRc of the parameter representative of the lateral motion of the vehicle.

Exemplarily the parameter representative of the lateral motion consists of a yaw rate of the vehicle.

Exemplarily the command and control unit 8 is programmed and configured for receiving as input in real time a third signal representative of the current value YRc of the yaw rate. To this end the control system 99 comprises exemplarily a detection sensor 12 (FIG. 1) of the current value YRc of the yaw rate. The sensor 12 is exemplarily connected to the command and control unit 8 and arranged on board the vehicle, and may for example be of the 3DOF IMU type (preferably it may coincide with the sensor 11).

In one embodiment (not shown), the parameter representative of the lateral motion may comprise a lateral acceleration and/or a slip angle of the vehicle (e.g. in addition to or as an alternative to the yaw rate).

Exemplarily, the method therefore comprises calculating in real time (block MzC FIG. 5) a corrective moment Mz as a function of the reference value YRr and of the current value YRc of the parameter representative of the lateral motion.

Exemplarily calculating in real time the corrective moment Mz comprises performing in real time a difference between the reference value YRc and the current value YRc of the parameter representative of the lateral motion of the vehicle, and calculating the corrective moment Mz as a function of the aforementioned difference.

Routine TC

Figure 6:
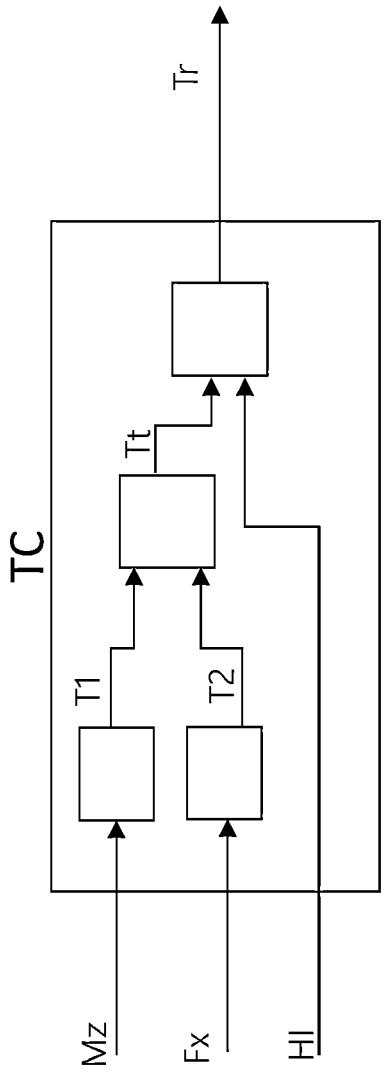
Figure 7A:
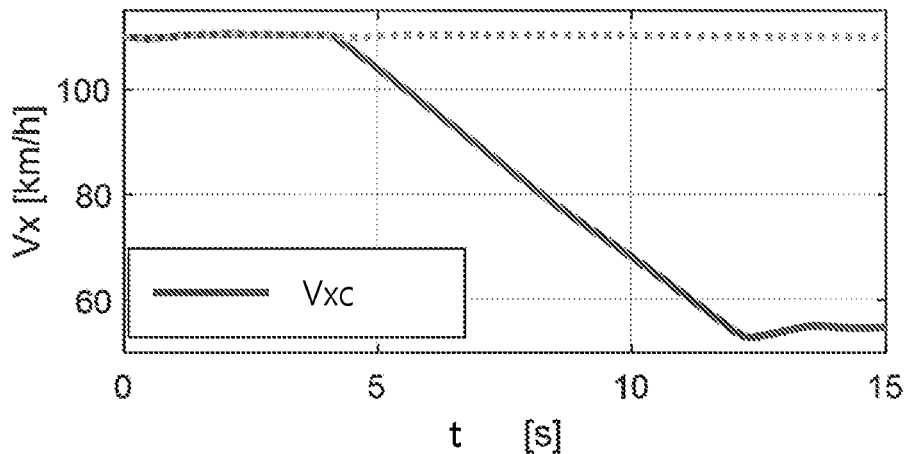
FIGS. 7a, 7b, 7c, 8a, 8b, 8c, 9a, 9b, 9c and 10 show some results of a simulation of the method according to the present invention.
Figure 7B:
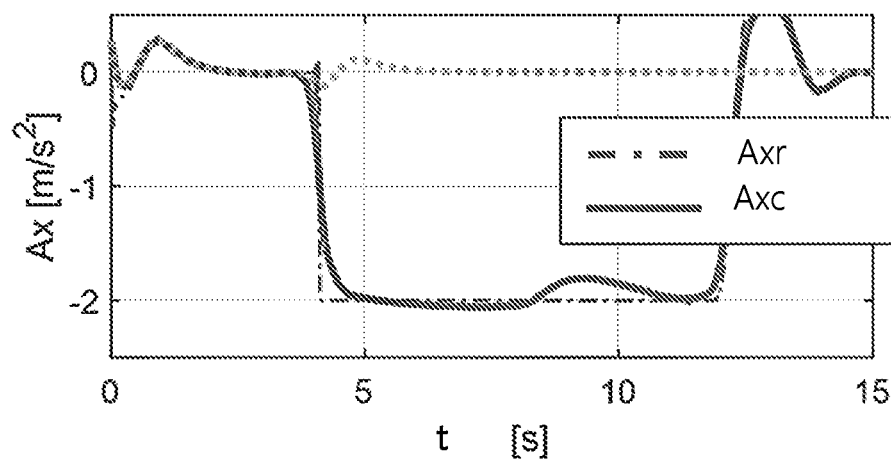
Figure 7C:
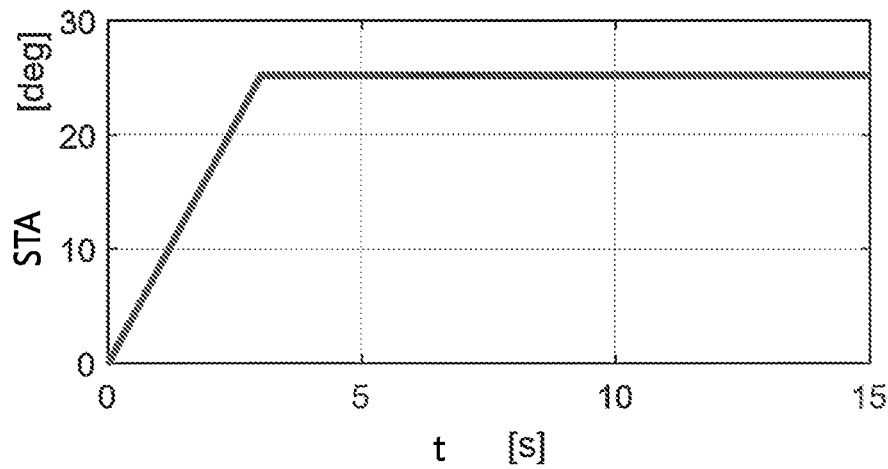

FIG. 6 schematically shows the routine TC for calculating the respective torque to be applied to the wheels 7.

Exemplarily the method comprises calculating a respective torque Tr (torque real) to be applied to each wheel 3 of the vehicle as a function of the corrective moment Mz, of the corrective longitudinal force Fx and of the hydroplaning intensity HI of each tyre 3 of the vehicle.

Exemplarily, it is provided calculating, for each wheel, a respective first torque T1 as a function only on the corrective moment Mz.

The group of the respective first torques T1 ideally represents the set of torques that, once applied to the respective wheels, generates on the vehicle 1 (thanks to the pneumatic-road surface interaction) a resulting moment equal to the corrective moment Mz.

For example, to obtain a given corrective moment Mz that induces a rotation of the vehicle to the left with respect to the direction of travel, the routine TC exemplary calculates:
  in the case of braking torque, a respective first torque to be applied to at least one of the left wheels greater than the first torque to be applied to the right wheels, or
  in the case of a driving torque, a respective first torque to be applied to at least one of the right wheels greater than the first torque to be applied to the left wheels.

For example, the calculation of the routine TC can result in a respective first braking torque T1 not null for the rear left wheel RL and a respective first torque T1 null for the remaining wheels.

Exemplarily, it is also provided calculating, for each wheel, a respective second torque T2 as a function only of the corrective longitudinal force Fx.

The group of the respective second torques T2 ideally represents the set of torques that, once applied to the respective wheels, generates on the vehicle 1 (thanks to the tyre-road surface interaction) a resulting force equal to the corrective longitudinal force Fx.

For example, the calculation of the routine TC may result in a respective second torque T2 not null for each wheel of the vehicle, where the respective second torques T2 are preferably equal to each other for the wheels belonging to the same axle (for braking the vehicle without introducing instability).

Exemplarily it is therefore provided calculating a respective theoretical torque Tt for each wheel, each respective theoretical torque Tt being given by the algebraic sum of the respective first torque T1 and of the respective second torque T2.

The respective theoretical torque Tt therefore represents the total torque to be ideally applied to the respective wheel.

However, the Applicant has noted that, in hydroplaning conditions, the grip between tyre and road surface is lower than in a non-hydroplaning condition. Therefore, the respective theoretical torque Tt when applied to the respective wheel could be excessive and lead to the blocking of the wheel, generating a condition of strong instability for the vehicle (and therefore very dangerous).

In order to cope with this, the control method of the present invention inserts into the calculation of each respective torque Tr also a dependence on the hydroplaning intensity HI of each tyre.

Exemplarily, it is therefore provided calculating each torque Tr to be applied to each respective wheel as a function of the respective theoretical torque Tt and of the hydroplaning intensity HI of all the tyres. In particular, the following criteria may be applied:
- a maximum value of the respective calculated torque Tr decreases with increasing hydroplaning intensity of the respective tyre (and vice versa);
- the respective calculated torque Tr for a wheel is null on condition that the respective hydroplaning intensity HI of the respective tyre 3 is greater than or equal to a second threshold greater than the first threshold (the second threshold is exemplarily set based on the previously described hydroplaning levels, for example Tr=0 if HI>=5);
- each respective torque Tr is calculated by redistributing the respective torques Tr so as to distribute each torque Tr to the respective wheel reducing the torques close to their maximum value.

In other words, from the combination of the above criteria and as a function of the respective hydroplaning intensity HI of the tyres, each theoretical torque Tt is transformed (e.g. using appropriate mathematical methods, e.g. error minimisation) into the respective torque Tr.

Exemplarily the method finally comprises applying to each wheel of said vehicle said respective calculated torque Tr. To this end, the command and control unit 8 is exemplarily programmed and configured for commanding the actuation device 9 to apply to each wheel 7 of the vehicle the respective calculated torque Tr.

Simulation

The results obtained from a simulation of the control method according to the present invention will be now described with reference to the graphs of FIGS. 7-10.

The graphs of FIGS. 7(*a, b, c*)-9(*a, b, c*) have in abscissa a time axis t (expressed in seconds), while in ordinate a respective size/parameter relevant to the control method, as described below.

The exemplarily simulated situation is that of a rear-wheel drive vehicle comprising the aforementioned control system 99, which has to face a curve at constant longitudinal speed Vxc equal to about 115 km/h (FIG. 7*a* solid line), with a current substantially null value Axc of longitudinal acceleration (FIG. 7*b* solid line) and with steering angle STA that grows from 0° to 25° (FIG. 7*c*), and then remains constant at 25° in order to face said curve.

In the simulation the road surface has a region having a layer of water at a right portion of the roadway (curve exterior).

Figure 8A:
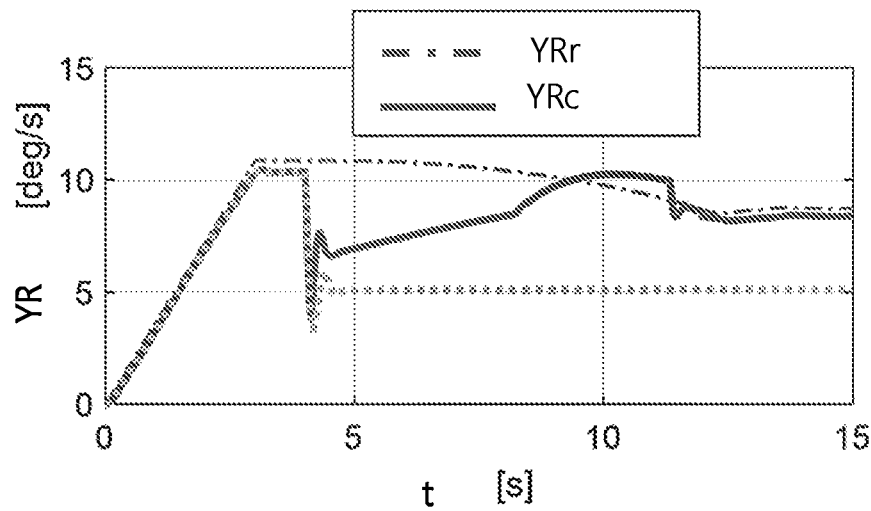
Figure 8B:
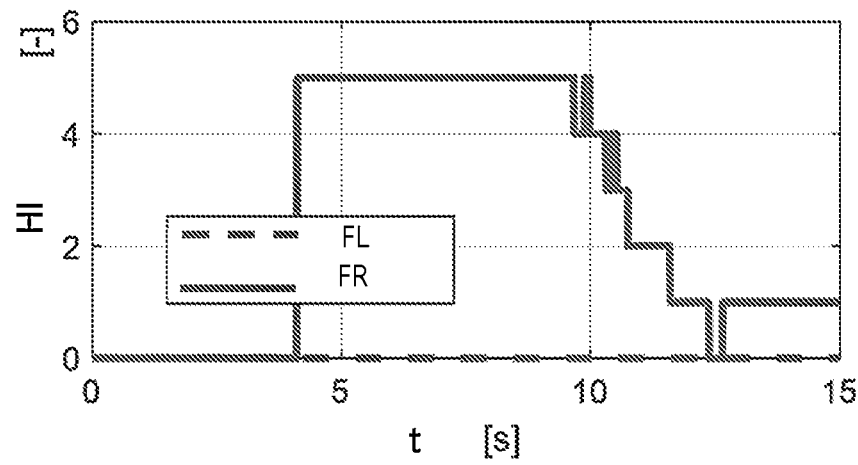

At instant t1 which is exemplarily approximately 4 s, the vehicle meets the aforementioned wet road surface region and the hydroplaning intensity HI of the front right wheel FR rises sharply to level five (expressed as hydroplaning levels from null to seven), as shown in FIG. 8*b* (solid line). There is therefore the aforementioned starting condition.

Figure 9A:
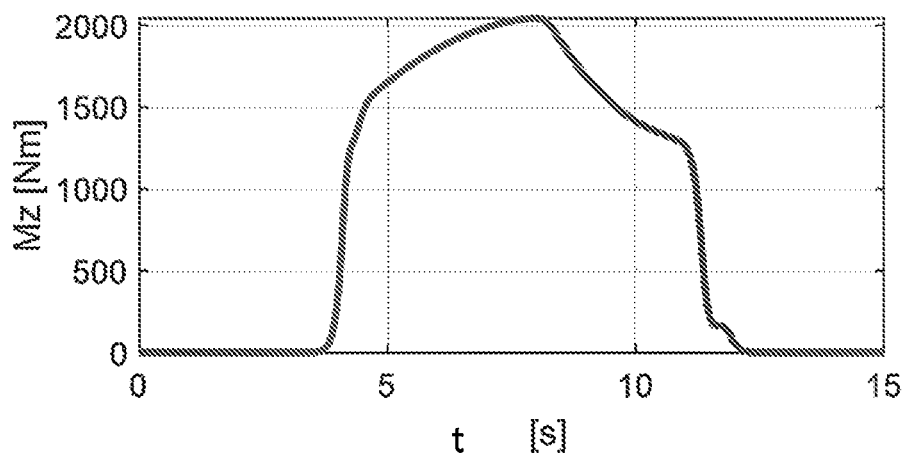
Figure 9B:
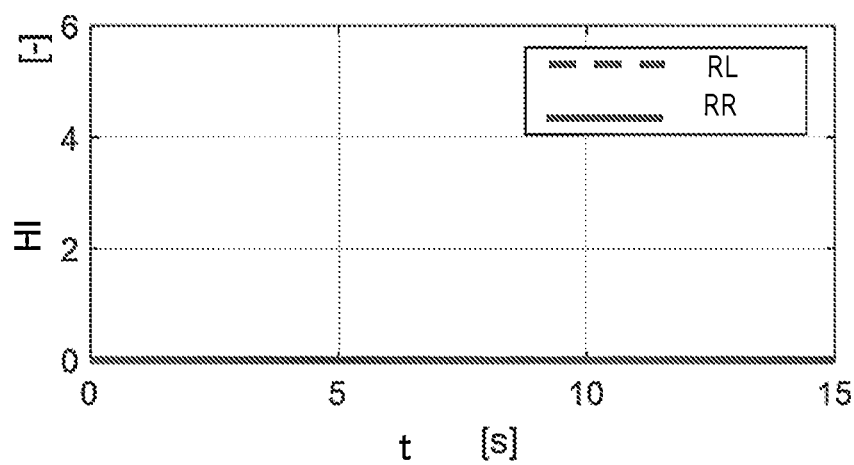
Figure 9C:
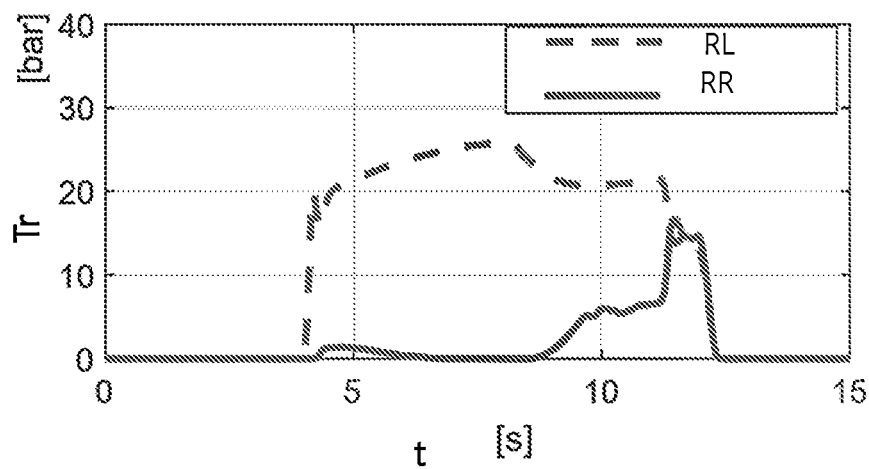

On the other hand, it can be noted that the hydroplaning intensities HI of the front and rear left wheels FL and RL remain null as the wet region is situated on the right of the roadway (FIGS. 8*b* and 9*b*, dashed lines). It can also be noted that the hydroplaning intensity of the rear right wheel RR also remains null (FIG. 9*b* solid line) as the front right wheel FR, entering the layer of water, moves the water clearing the road for the rear right wheel.

Once the starting condition has occurred, the method performs the operations of the routines SL, SA, and TC described above.

As regards the routine SL, a reference value Axr of the longitudinal acceleration is set at $-2$ m/s$^2$ (FIG. 7*b* dash-dot line), and the current value Axc of the longitudinal acceleration of the vehicle (FIG. 7*b* solid line) is acquired (more precisely it continues to be acquired in the example) in real time. The corrective longitudinal force Fx (not shown) is then calculated in real time as a function of the difference Axr and Axc. It can be observed that the current value Axc of the longitudinal acceleration is settled almost immediately at the reference value Axr, therefore the calculated force Fx, possibly after an initial peak, will remain substantially null. This happens because the deceleration introduced by the respective torques calculated on the basis of the only corrective moment Mz (described below), together with any interruption of transmission of driving force by the motor, is sufficient to keep the current value Axc of the longitudinal acceleration under control.

As regards the routine SA, the current value YRc of the yaw rate is acquired in real time (FIG. 8*a* solid line) and the reference value YRr of the yaw rate is calculated in real time (FIG. 8*a* dash-dot line) as a function of the current value of the longitudinal speed Vxc and of the steering angle STA.

It can be noted that before the starting condition, i.e. for instants before t1, the current value of the yaw rate YRc coincides with the reference value YRr, as the vehicle responds to the driver's commands.

Upon entering the wet region of the road surface, a deviation occurs between the two values and the system then proceeds to calculate in real time the corrective moment Mz (FIG. 9*a*). In the example the corrective moment Mz is such as to generate a counterclockwise rotation of the vehicle, to make it move in accordance with the set steering angle STA (FIG. 7*c*) and with the current value of the longitudinal speed Vxc.

Figure 8C:
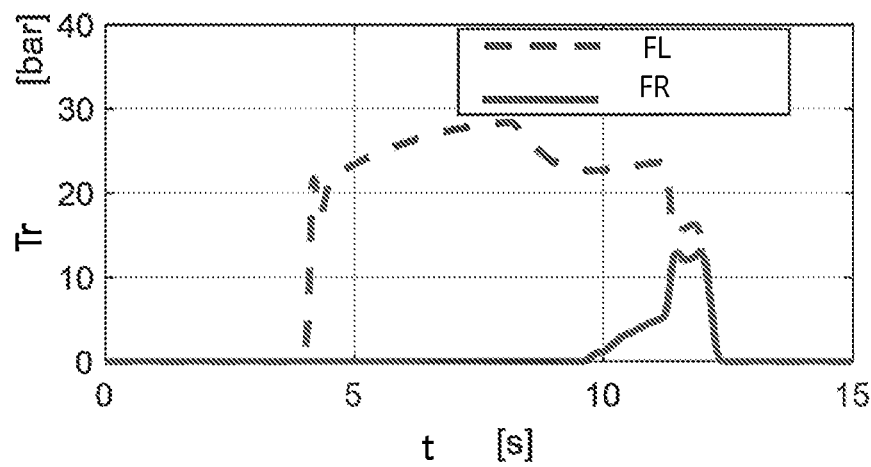

The respective torques Tr are then calculated in real time as previously described as a function of the corrective moment Mz, of the corrective longitudinal force Fx and of the respective hydroplaning intensity HI of all the tyres. The temporal trends of the respective calculated torques Tr, expressed in terms of the pressure (bar) exerted by the braking system of the vehicle at the brake caliper of each wheel, are shown in FIGS. 8*c* (front wheels) and 9*c* (rear wheels).

As regards the front wheels (FIG. 8*c*), it can be observed that the routine TC initially distributes a respective torque Tr only to the front left wheel FL (dashed line), while the respective torque of the front right wheel remains null until about 10 seconds. This happens because initially the hydroplaning intensity of the front right wheel FR is equal to five, that is too high, and therefore no respective torque can be allocated to that wheel without risking blocking the wheel itself (in other words the maximum value of the respective torque is null).

As regards the rear wheels (FIG. 9c), the routine TC initially distributes a respective torque Tr only to the rear left wheel RL (dashed line). The union of the actions of the respective torques Tr of the left wheels is such that the vehicle is allowed to steer to the left in accordance with the intention of the driver.

From the graph of FIG. 8b, it can be seen that the hydroplaning intensity HI of the tyre of the front right wheel FR decreases over time. This is because at the same time the longitudinal speed Vxc of the vehicle is also decreasing because of the respective braking torque Tr that is being applied to the left wheels FL and RL.

Thanks to the real-time determination of the hydroplaning intensity HI of the front right wheel FR, it is possible to detect the instant t2 (around 10 seconds) at which this hydroplaning intensity falls below the second threshold (while remaining above the first threshold).

In this way, the routine TC, which calculates in real time each respective torque Tr as a function of the hydroplaning intensity Hi of all the tyres, proceeds, as shown in FIG. 8c (solid line), to allocate a respective torque Tr also to the front right wheel FR (since the tyre of that wheel, in accordance with the respective hydroplaning intensity value, can now withstand a respective torque Tr without generating a blocking of the wheel).

The entire system, thanks to the operations carried out in real time, moves to a stable condition, as shown by the graphs of FIGS. 7(a, b, c)-9(a, b, c), where the vehicle has slowed down and the hydroplaning intensity of the front right wheel FR has returned below the first threshold (HI<2, i.e. HI=1).

When this happens, the system returns the control to the driver (e.g. re-establishes the transfer of driving torque from the motor to the driving wheels and re-establishes the possibility of accelerating).

Figure 10:
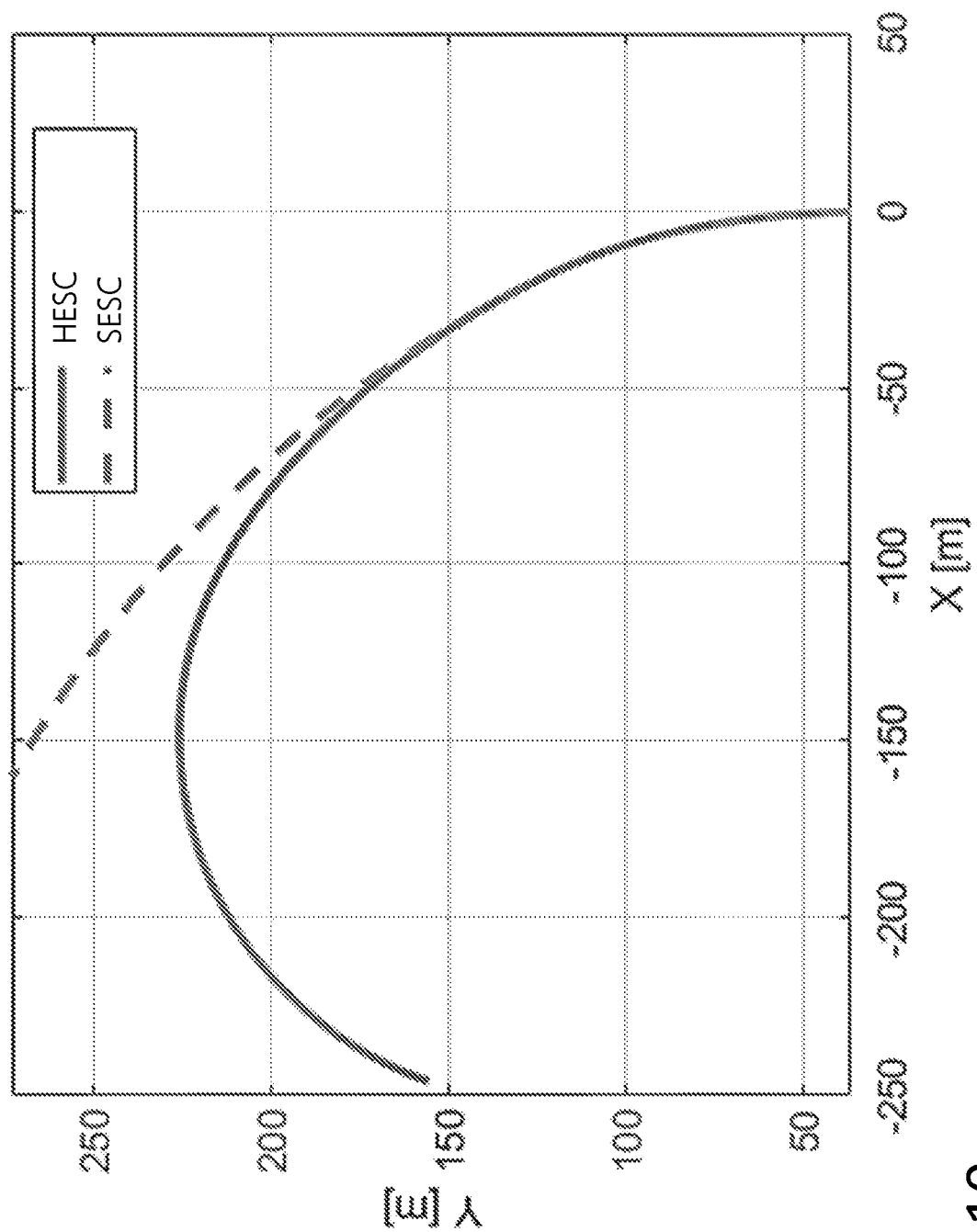

With reference finally to FIG. 10, it compares (on a Cartesian plane X-Y) the corresponding trajectory followed by the vehicle on which the control system acted according to the present invention (HESC—solid line) in the example described above and the trajectory of the same vehicle without such control system (SESC—dotted line) under the same driving conditions described above.

Thanks to the control system and method according to the present invention, the vehicle HESC has been able to follow a trajectory responsive to the intentions of the driver (and therefore to complete the curve even in the face of a sudden hydroplaning condition suffered on the right side of the vehicle), unlike the vehicle SESC which fails to maintain the desired turning radius and/or in general achieves a much wider turning radius (with consequent risk of impact and/or loss of control).

The invention claimed is:

1. A method for controlling a vehicle moving on a road surface, wherein the method comprising:
for each tyre of the vehicle rolling on the road surface, determining in real time a respective hydroplaning intensity (HI);
comparing in real time each respective hydroplaning intensity (HI) with a first threshold; and
upon the occurrence of a starting condition such that the respective hydroplaning intensity (HI) of at least one tyre reaches the first threshold, then:
acquiring in real time a current value of a longitudinal speed (Vxc) of the vehicle;
acquiring in real time a steering angle (STA) of the vehicle;
calculating in real time a reference value (YRr) of a parameter representative of a lateral motion of the vehicle as a function of the current value of the longitudinal speed (Vxc) and of the steering angle (STA);
detecting in real time a current value (YRc) of the parameter;
calculating in real time a corrective moment (Mz) as a function of the reference value (YRr) and of the current value (YRc) of the parameter; and
applying in real time to each wheel of the vehicle a respective torque (Tr) calculated in real time as a function of the corrective moment (Mz) and of the hydroplaning intensity (HI) of the respective tyre.

2. The method according to claim 1, wherein further comprising, for each tyre, detecting in real time at least one respective quantity (Q) representative of a motion of the tyre, and wherein the at least one respective quantity (Q) comprises at least one of the following quantities referred to a single tyre: displacement, speed, acceleration, and deformation.

3. The method according to claim 2, wherein the at least one respective quantity (Q) is representative of a motion of a crown portion of the tyre, and wherein the respective quantity (Q) is detected at an inner surface of the tyre at the crown portion.

4. The method according to claim 2, wherein determining in real time the respective hydroplaning intensity (HI) is performed as a function of the respective quantity (Q).

5. The method according to claim 1, wherein the parameter representative of the lateral motion comprises at least one of the following quantities: yaw rate, lateral acceleration, and slip angle.

6. The method according to claim 5, wherein the parameter representative of the lateral motion consists of the yaw rate.

7. The method according to claim 1, wherein calculating in real time the corrective moment (Mz) comprises performing in real time a difference between the reference value (YRr) and the current value (YRc) of the parameter representative of the lateral motion of the vehicle, and calculating the corrective moment (Mz) as a function of the difference.

8. The method according to claim 1, wherein the respective torque (Tr) decreases as the hydroplaning intensity (HI) of the respective tyre increases.

9. The method according to claim 1, wherein a maximum value of the respective torque (Tr) decreases as the hydroplaning intensity (HI) of the respective tyre increases.

10. The method according to claim 1, wherein the respective torque (Tr) is null on a condition when the respective hydroplaning intensity (HI) of the respective tyre is greater than or equal to a second threshold, and the second threshold being greater than the first threshold.

11. The method according to claim 1, further comprising, upon the occurrence of the starting condition, setting a reference value (Axr, Vxr) of a parameter representative of a longitudinal motion of the vehicle, acquiring in real time a current value (Axc, Vxc) of the parameter representative of the longitudinal motion, calculating in real time a corrective longitudinal force (Fx) as a function of the reference value (Axr, Vxr) and of the current value (Axc, Vxc) of the parameter representative of the longitudinal motion, and wherein the respective torque (Tr) is calculated also as a function of the corrective longitudinal force (Fx).

12. The method according to claim 11, wherein the parameter representative of the longitudinal motion comprises at least one of the following quantities: longitudinal acceleration, and longitudinal speed.

13. The method according to claim 1, wherein each respective torque (Tr) applied to a wheel of the vehicle is calculated also as a function of the respective hydroplaning intensity (HI) of the tyres associated to remaining wheels of the vehicle.

14. A control system of a vehicle moving on a road surface, wherein the system comprising:
- a detection module for detecting in real time a respective hydroplaning intensity (HI) for each tyre of the vehicle rolling on the road surface;
- an actuation device operatively connected to each wheel of the vehicle; and
- a command and control unit operatively connected to the detection module and to the actuation device, and programmed and configured for:
- comparing each respective hydroplaning intensity (HI) with a first threshold;
- when an occurrence of a starting condition of the respective hydroplaning intensity (HI) of at least one tyre reaches the first threshold, then:
  - receiving as input in real time a first signal representative of a current value of a longitudinal speed (Vxc) of the vehicle;
  - receiving as input in real time a second signal representative of a steering angle (STA) of the vehicle;
  - calculating in real time a reference value (YRr) of a parameter representative of a lateral motion of the vehicle as a function of the first and second signal;
  - receiving as input in real time a third signal representative of a current value (YRc) of the parameter;
  - calculating in real time a corrective moment (Mz) as a function of the reference value (YRr) and of the current value (YRc) of the parameter; and
  - commanding the actuation device for applying in real time to each wheel a respective torque (Tr) calculated in real time as a function of the corrective moment (Mz) and of the hydroplaning intensity (HI) of the respective tyre.

15. The system according to claim 14, wherein the detection module comprises a respective monitoring device associated to each tyre, each monitoring device being fixed at a crown portion of the respective tyre, wherein the monitoring device is suitable for detecting at least one respective quantity (Q) referred to the respective tyre, the at least one respective quantity (Q) being representative of a motion of the crown portion of the tyre, and wherein the at least one respective quantity (Q) comprises at least one of the following quantities referred to a single tyre: displacement, speed, acceleration, and deformation.

16. The system according to claim 15, wherein the command and control unit is programmed and configured for performing a method for controlling and wherein the actuation device comprises a braking system and/or an engine system.

17. A vehicle comprising the control system according to claim 14.

* * * * *